United States Patent [19]

Peng

[11] Patent Number: 5,742,420
[45] Date of Patent: Apr. 21, 1998

[54] OPTICAL SCANNER FOR GENERATING SCANNING LINES ON ALL SIDES OF AN OBJECT

[75] Inventor: Ke-Ou Peng, Delft, Netherlands

[73] Assignee: Opticon Sensors Europe B.V., Hoofddorp, Netherlands

[21] Appl. No.: 675,926

[22] Filed: Jul. 5, 1996

[30] Foreign Application Priority Data

Jul. 5, 1995 [EP] European Pat. Off. .............. 95201841

[51] Int. Cl.$^6$ .................................................. G02B 26/08
[52] U.S. Cl. .......................... 359/201; 359/203; 359/216; 235/467
[58] Field of Search .......................... 359/196–226, 359/831, 833, 834, 837; 358/474, 296; 250/234–236; 235/454, 462, 467, 470, 472; 347/258–261

[56] References Cited

U.S. PATENT DOCUMENTS 5,408,352   4/1995   Peng .......................................... 359/203

FOREIGN PATENT DOCUMENTS

0 028 108   5/1981   European Pat. Off. .
0 485 029   5/1992   European Pat. Off. .
0 653 723   5/1995   European Pat. Off. .
2 225 650   11/1992  United Kingdom .

Primary Examiner—James Phan
Attorney, Agent, or Firm—Young & Thompson

[57] ABSTRACT

Optical scanner with a light source (1) for producing a light beam (A), focusing optics (2), means for producing a predetermined first scanning pattern (SP1–SP4) of separate scanning lines, first reflecting means (9; 101–104, 201–204) arranged to receive said predetermined first scanning pattern and to reflect each of the scanning lines of said first scanning pattern in a predetermined direction, and second reflecting means (10; 20; 30; 106, 107, 206, 207) arranged about a scanning axis (T), to receive said scanning lines and reflect them towards said scanning axis from several different directions in order to produce a second scanning pattern of scanning lines on all sides of an object (Q), said scanning lines in said second scanning pattern being substantially parallel to said scanning axis (T).

15 Claims, 8 Drawing Sheets fig-1 fig-2 fig-5a fig-5b fig-5c fig-5d fig-6a fig-6b fig-7a fig-7b fig-7c fig-7d

Fig-8b

OPTICAL SCANNER FOR GENERATING SCANNING LINES ON ALL SIDES OF AN OBJECT

BACKGROUND OF THE INVENTION

The present invention relates to an optical scanner for generating scanning lines on all sides of an object.

Figure 1:
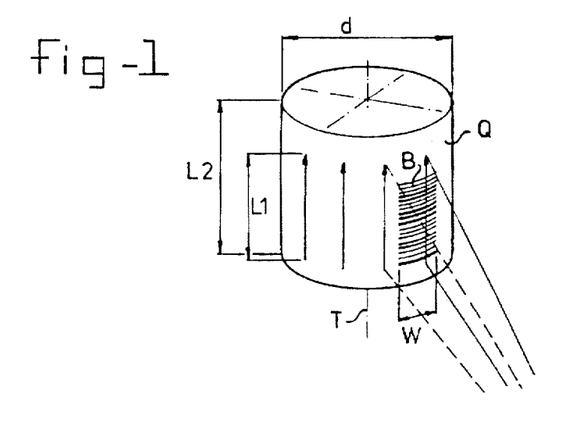
FIG. 1 shows an object having a barcode on its external surface.

The present invention can best be described with reference to FIG. 1. In FIG. 1 an object Q is shown having a barcode B located on an outer surface. The longitudinal direction of barcode B is substantially parallel to an axis T. Because the barcode B on the outer surface of object Q is not planar, and, moreover, the diameter d of the cylindrical outer surface shown may vary (barcode B can, e.g., be printed on the outer surface of bottles having varying diameters) the depth of field for the reading optics used should be large. Therefore, the application of a laser scanner is preferred.

Since barcodes B can be printed on an arbitrary side of the object Q and at an arbitrary axial location on the external surface, an optical scanner is needed which is able to produce a scanning pattern which meets the following conditions:

1) the scanning pattern produced should consist of scanning lines substantially parallel to scanning axis T;
2) when barcode B having a width W is printed on object Q of a cylindrical shape having a diameter d the number of scanning lines produces should be not less than πd/W;
3) the scanning lines produced must have a length L1 which is at least twice the length L2 of object Q such that barcode B at any arbitrary axial location at the outer surface can be read during the time period the object moves along scanning axis T;
4) the scanning pattern produced should illuminate object Q on all sides.

Moreover, in practice, it is often required that barcode B on object Q can be detected when the object Q drops. In European patent application 95201405.8 of the present applicant, which is prior art under Article 54(3) EPC, optical scanners are described which are able to produce scanning lines on all sides of an object falling downwards. However, this European patent application describes the use of a so-called "internal helical scanning pattern generator", in which, e.g., a mirror is used which is driven by suitable driving means to rotate about an axis of rotation and to oscillate about an oscillation axis, the rotation axis and the oscillation axis being perpendicular to one another. In the embodiments described in this European patent application, the distance between adjacent scanning lines on the object depends on the rotation speed about the rotation axis.

When an object drops through the scanner described in European patent application 95201405.8 it is required that the entire scanning pattern on all sides of the object is produced within a very short time period, i.e. the speed required for generating a full scanning pattern on all sides of the object must be much higher than the speed of falling of the object. Theoretically, it is possible to produce scanning lines on the object which are more or less parallel to the scanning axis. However, to achieve a very fast generation of a full scanning pattern with lines parallel to the scanning axis the oscillation speed of the mirror mentioned above in the embodiments of European patent application 95201405.8 must be very high which is in practice very difficult. Driving devices for rotating the mirror about a rotation axis and for oscillating the mirror about an oscillation axis perpendicular to the rotation axis have been described in European patent application 93202734.5. However, the constructions shown in European patent application 93202734.5 are not well suitable for oscillating the mirror with very high speed and with large oscillation amplitudes.

SUMMARY OF THE INVENTION

Therefore, the object of the present invention is to present an optical scanner for generating scanning lines on all sides of an object, which scanning lines are substantially parallel to a scanning axis and which are produced fast enough to detect barcodes for other symbols located at the external surface of an object when it drops through the scanner.

In order to obtain the object defined above the optical scanner according to the invention comprises a light source for producing a light beam, focusing optics, means for producing a predetermined first scanning pattern of separate scanning lines, first reflecting means arranged to receive the predetermined first scanning pattern and to reflect each of the scanning lines of the first scanning pattern in a predetermined direction, and second reflecting means arranged about a scanning axis, to receive the scanning lines and reflect them towards the scanning axis from several different directions in order to produce a second scanning pattern of scanning lines on all sides of an object, the scanning lines in the second scanning pattern being substantially parallel to the scanning axis.

It is observed that European patent application 95201405.8 mentioned above describes an optical scanner comprising a light source for producing a light beam, focusing optics, means for producing a predetermined first scanning pattern, first reflection means arranged to receive the predetermined first scanning pattern and to reflect the first scanning pattern in a predetermined direction, and second reflecting means arranged about a scanning axis, to receive the reflected first scanning pattern towards the scanning axis from several different directions in order to produce a second scanning pattern on all sides of an object. However, the known means for producing the predetermined first scanning pattern do not produce a set of separate scanning lines, but a continuous scanning line.

In a first embodiment according to the invention, the means for producing a predetermined first scanning pattern of separate scanning lines comprises means for producing a star-shaped scanning pattern, which may comprise a first mirror connected to a motor for rotating the first motor about an axis of rotation, the first mirror being arranged for receiving and reflecting the light beam from the light source, a mirror array provided with several reflective facets for receiving and reflecting the light beam from the first mirror, and at least one second mirror rotatable together with the first mirror and arranged for receiving the light beam from the mirror array and arranged for producing the star-shaped scanning pattern about the axis of rotation. Such means for producing such a scanning pattern is, essentially, known from U.S. Pat. 5,408,352, assigned to the applicant of the present patent application.

The second mirror may be provided with two planar, reflective facets tilted about a predetermined angle with respect to the axis of rotation.

In a second embodiment according to the invention the means for producing a predetermined first scanning pattern of separate scanning lines comprises means for producing a star-shaped scanning pattern, which comprises a polygon rotatable about a first axis of rotation and rotatable about a second axis of rotation perpendicular to the first axis of rotation.

In that second embodiment the polygon may be supported by a shaft which is in turn supported by a frame, the frame being connected to a motor for rotating the frame about the first axis of rotation, the shaft being provided with at least one wheel arranged to run on a track for rotating the shaft about the second axis of rotation when the motor is in operation. A similar kind of polygon that is rotatable about a first axis of rotation and about a second axis of rotation which is perpendicular to the first one is described in pending British patent application 9402506.1 (U.S. patent application Ser. No. 08/386360).

In order to enhance the efficiency of the optical scanner according to the second embodiment it is preferably provided with an optical deflector arranged for deflecting the light beam originating from the light source before it is impinges upon the polygon, the optical deflector being selected from the following group of deflectors: an optical wedge, a mirror, and a holographic element.

The first reflecting means may comprise a ring-shaped mirror, whereas the second reflecting means may be selected from the following group of reflectors: a conic mirror, a prism, and a mirror array.

In a third embodiment of the present invention the predetermined first scanning pattern of separate scanning lines comprises means for producing a scanning pattern of substantially parallel scanning lines, which means may comprise a polygon rotatable about an axis of rotation and comprising a plurality of reflective facets, each of the reflective facets being tilted about its own predetermined angle of inclination with respect to the axis of rotation. Instead of one polygon two polygons may be used, which are rotatable about perpendicular axes of rotation.

In the third embodiment the first reflecting means may comprise a first plurality of separate mirrors arranged for receiving and reflecting the scanning pattern of substantially parallel scanning lines, and for directing each of the scanning lines into a predetermined direction, and wherein the second reflecting means may comprise a second plurality of separate mirrors symmetrically arranged about the scanning axis.

BRIEF DESCRIPTION OF THE DRAWINGS

The invention will now be explained with reference to some drawings in which some embodiments of the present invention are shown for illustrating purposes only and not for limiting the scope of the present invention. In the drawings:

FIG. 6b shows focusing means that may be used with the mirror array shown in FIG. 6a;

FIGS. 7a through 7d show arrangements of polygons that may be used in a third embodiment according to the invention, which is shown in FIG. 8a;

FIG. 8b shows the application of focusing means that may be used in the third embodiment according to FIG. 8a.

DESCRIPTION OF THE PREFERRED EMBODIMENTS

Figure 2:
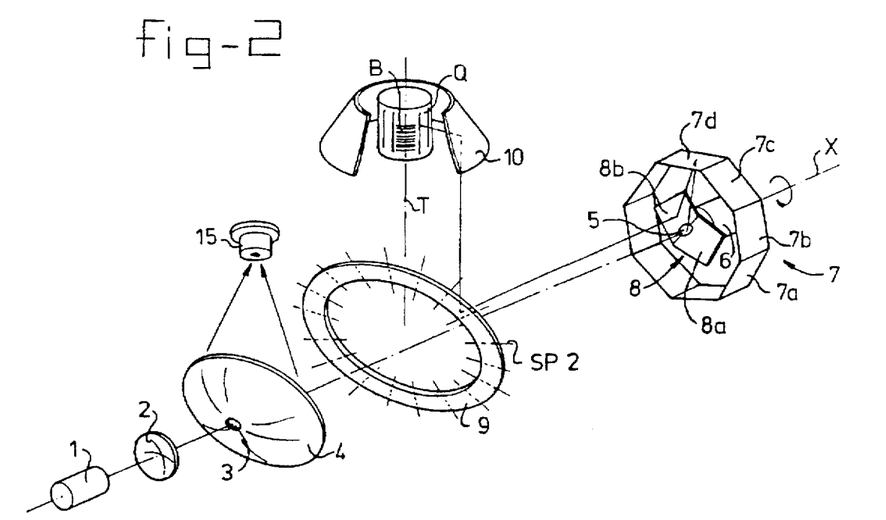
FIG. 2 shows a first embodiment of an optical scanner according to the present invention.

In the first embodiment of the present invention, as shown in FIG. 2, a light source 1, preferably a laser source, produces a light beam A. Light beam A is focused by suitable optics 2 and directed to a mirror 5 through a hole 3 in a light collector 4. Mirror 5 is driven by a motor 6 to rotate about a rotation axis X.

Light beam A is reflected by mirror 5 towards a mirror array 7 having reflective facets 7a, 7, 7c, 7d, . . . . Reflected by the facets 7a, 7b, . . . . , the light beam A is directed to a second rotating mirror 8 which rotates together with the mirror 5.

Figure 3A:
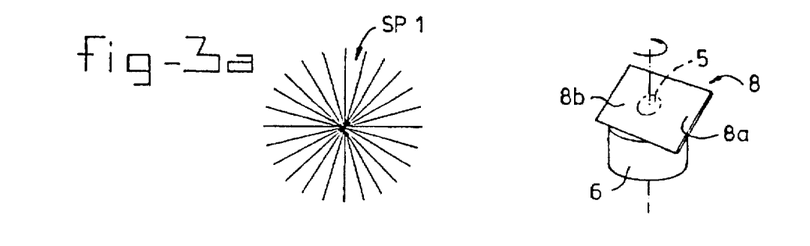
FIGS. 3a and 3b show intermediate scanning patterns that may be produced within the optical scanning according to FIG. 2.

If, as shown in FIG. 3a, mirror 8 would consist of two reflecting facets 8a, 8b, parallel to mirror 5 the light beam A after being reflected by reflecting facets 8a, 8b, would generate a starlike scanning pattern SP1 symmetrical around the axis of rotation X. A scanning pattern generator comprising mirrors 5, 8a, 8b, a motor 6, and a mirror array 7, in which the mirrors 8a and 8b are parallel to the mirror 5 and in which these elements are arranged as shown in FIG. 2 is, essentially, known from U.S. Pat. No. 5.408.352.

For illustrating purposes, a starlike scanning pattern has been schematically depicted in the arrangement according to figure 2 at a location where a ring-shaped mirror 9 is arranged. The ring-shaped mirror may be planar in a plane intersecting the axis of rotation X by a predetermined angle, e.g., being 45°. Those line segments of the scanning pattern intersecting the ring-shaped mirror 9 will be reflected towards a conic mirror 10, which reflects them towards the scanning axis T. Because of the tilting angle of, e.g., 45° between the ring-shaped mirror 9 and the axis of rotation X the scanning pattern produced by the conic mirror 10 illuminates object Q falling through the conic mirror 10 and through the ring-shaped mirror 9 from all sides. The number of scanning lines produced on object Q depends on the number of facets 7a, 7b, 7c, 7d, . . . , of mirror array 7.

However, if the scanning pattern would be the starlike scanning pattern SP1 a large part of scanning pattern would not be reflected by the ring-shaped mirror 9. Thus the efficiency of the arrangement with mirror 8 according to FIG. 3a is not optimal.

Figure 3B:
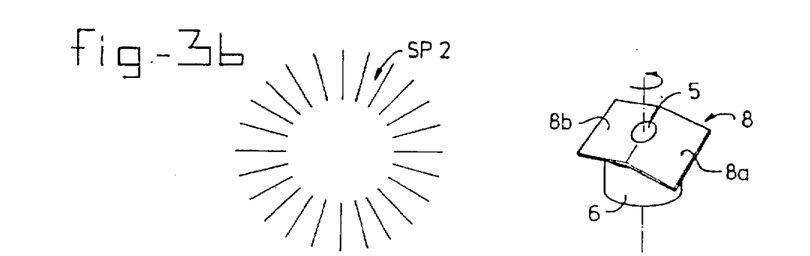

To enhance the efficiency, preferably, the arrangement of mirrors 8a, 8b as shown in FIG. 3b is used. FIG. 3b shows mirrors 8a and 8b in a tilted relation relative to mirror 5. They are still arranged to rotate together with mirror 5. With the arrangement of mirrors 8a, 8b according to FIG. 3b, a starlike scanning pattern SP2 will be produced which is symmetrical about the axis of rotation X but with an open space in the centre, as shown in figure 3b. Mirrors 8a, 8b can be designed in such a way that the open space of the scanning pattern SP2 may substantially coincide with the hole in the ring-shaped mirror 9. Then, a large part of the scanning pattern SP2 may be reflected by the ring-shaped mirror 9 towards the conic mirror 10.

Light beam A illuminating object Q will be reflected back towards the conic mirror 10. The light reflected back by object Q will, thus, be reflected towards ring-shaped mirror 9 and towards light collector 4 by mirrors 8a, 8b, mirror array 7 and mirror 5. From light collector 4, the light reflected back is directed towards a detector 15, e.g., a photo sensor. Detector 15 is connected to suitable evaluating means (not shown) which are no part of the present invention.

Figure 4:
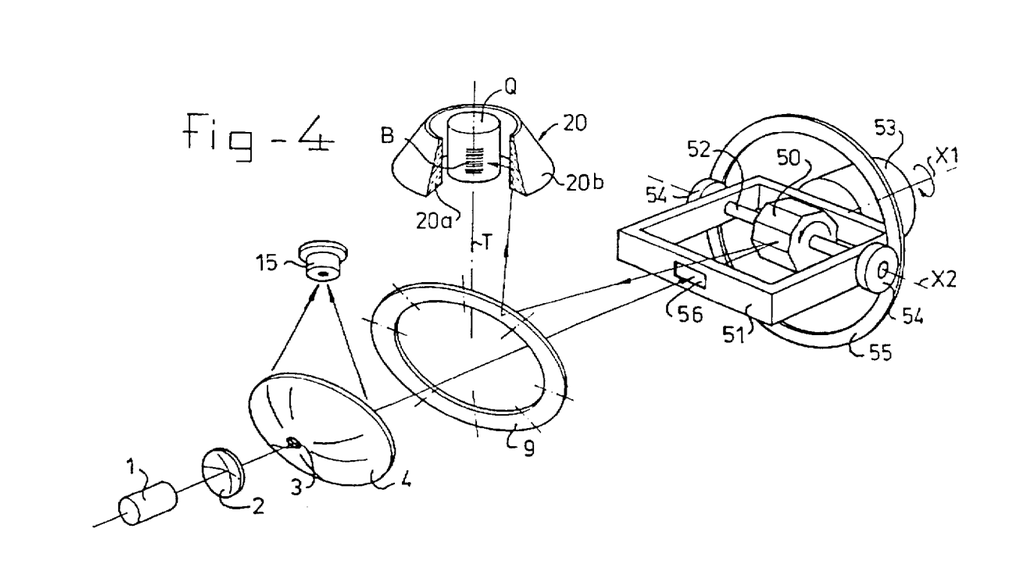
FIG. 4 shows a second embodiment of an optical scanner according to the invention.

FIG. 4 shows a second embodiment according to the invention, in which like elements as in FIG. 2 are indicated by the same reference numbers.

In the embodiment according to FIG. 4 a polygon 50 is applied which can be made to rotate about a first axis of rotation X1 and about a second axis of rotation X2. The axes X1 and X2 are preferably perpendicular to one another. Polygon 50 is fixed to a shaft 52 which is in turn supported by a frame 51 in such a way that the polygon 50 is able to rotate with shaft 52. The axis of rotation X2 coincides with the axis of symmetry of shaft 52. Frame 51 is connected to a motor 53. The motor 53 is able to rotate frame 51. Wheels 54 are connected to frame 51 and are able to rotate about axis of rotation X2. The wheels 54, fixed to the shaft 52, run along a track 55 when the frame 51 is driven to rotate by motor 53, thus forcing the shaft 52 and the polygon 50 to rotate about the second axis of rotation X2. A similar arrangement of polygon 50 has been described in pending British patent application 9402506.1

Frame 51 supports a prism 56, the function of which will be explained below.

Figure 5A:
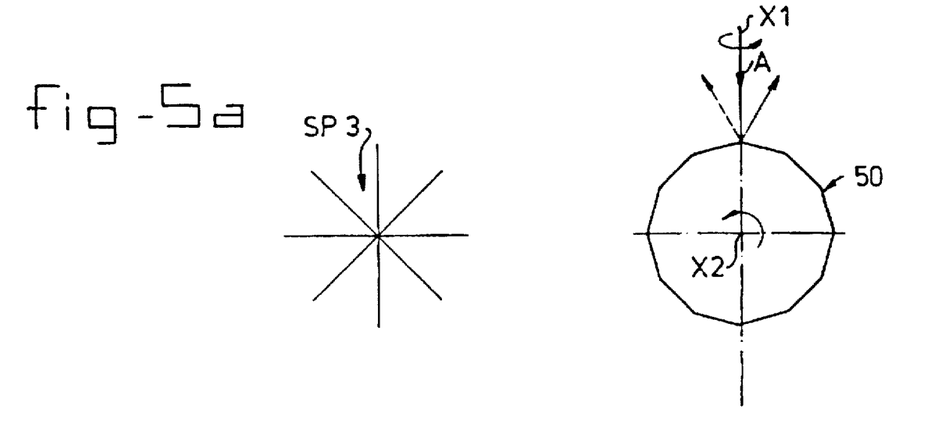
FIGS. 5a and 5b illustrate scanning patterns that may be produced within an optical scanner according to FIG. 4.
Figure 5B:
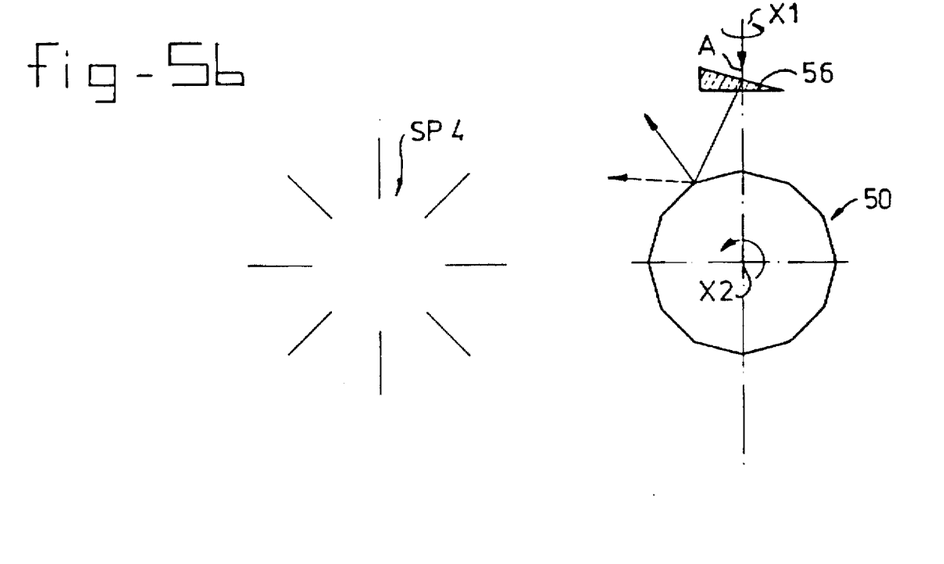

FIG. 5a shows light beam A impinging upon the polygon 50 without using the prism 56 as shown in FIG. 4. Then, because of the combined rotation of polygon 50 both about axis of rotation X1 and axis of rotation X2 a starlike scanning pattern SP3 will be generated, in which the scanning lines intersect each other in a common point of intersection as shown in the left part of figure 5a. Scanning pattern SP3 is like scanning pattern SP1, shown in FIG. 3a and results in the same non-optimal efficiency of the optical scanner. To enhance the efficiency prism 56 is applied. As shown in FIG. 5b, prism 56 is inserted into the path of propagation of light beam A before impinging upon the polygon 50. Beam A will be deflected by the prism 56 before impinging upon one of the facets of the polygon 50. Because of the combined rotations of the polygon 50 about axis of rotation X1 and axis of rotation X2 a starlike scanning pattern as depicted in FIG. 5b will be generated, however, having an open space in the centre like the scanning pattern SP2 of FIG. 3b. The arrangement according to FIG. 4 can be designed in such a way that a large part of the scanning pattern SP4 is directed to ring-shaped mirror 9 and is reflected to a prism 20. Prism 20 is provided with a receiving surface 20a designed for passing substantially the entire light beam A as far as reflected by ring-shaped mirror 9. Moreover, prism 20 is provided with a reflective outer surface 20b arranged for reflecting light beam A towards the scanning axis T in order to detect a barcode B on a falling object Q. Of course, instead of prism 20 the conic mirror 10 shown in FIG. 2 can be used.

Figure 5C:
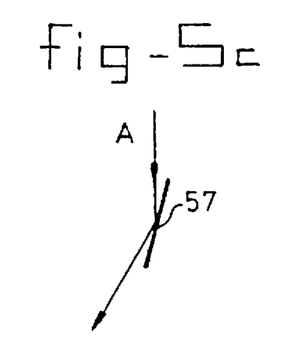
FIGS. 5c and 5d show alternative optical elements for a wedge used in the arrangement according to FIG. 4.
Figure 5D:
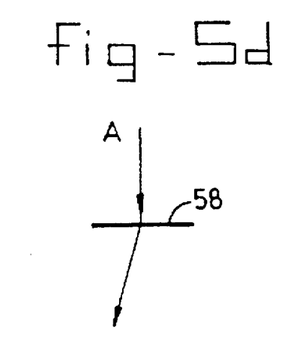

Instead of prism 56, a mirror 57, shown in FIG. 5c, or a holographic element 58, as shown in FIG. 5d, may be used.

Figure 6A:
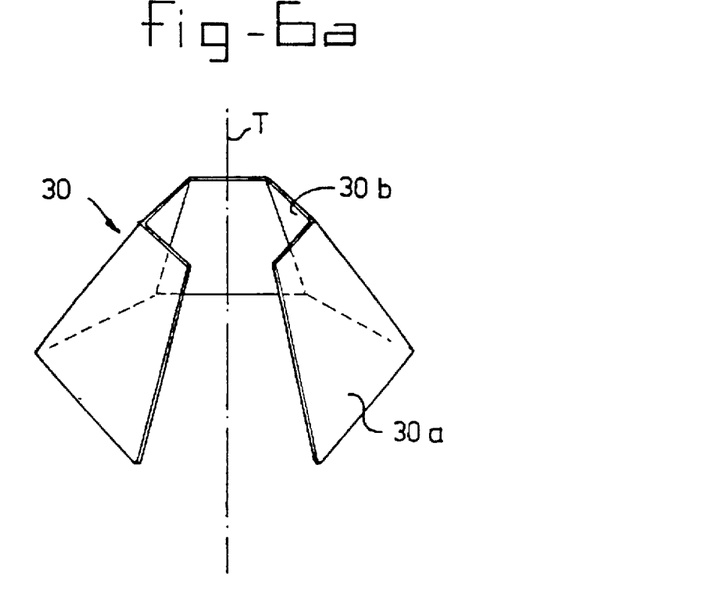
FIG. 6a illustrates a mirror array which may be used in the embodiments according to FIGS. 2 and 4.

A mirror array 30, as shown in FIG. 6a, may be used instead of conic mirror 10 or instead of prism 20. The mirror array 20, shown in FIG. 6a, is provided with several reflective facets 30a, 30b, . . . . , in a symmetrical arrangement about the scanning axis T. Each of the reflective facets 30a, 30b, . . . . , are tilted relative to the scanning axis T with a predetermined angle of inclination. Using planar reflective facets 30a, 30b, . . . . has the advantage that aberrations caused by using a conic mirror 10 disappear.

Figure 6B:
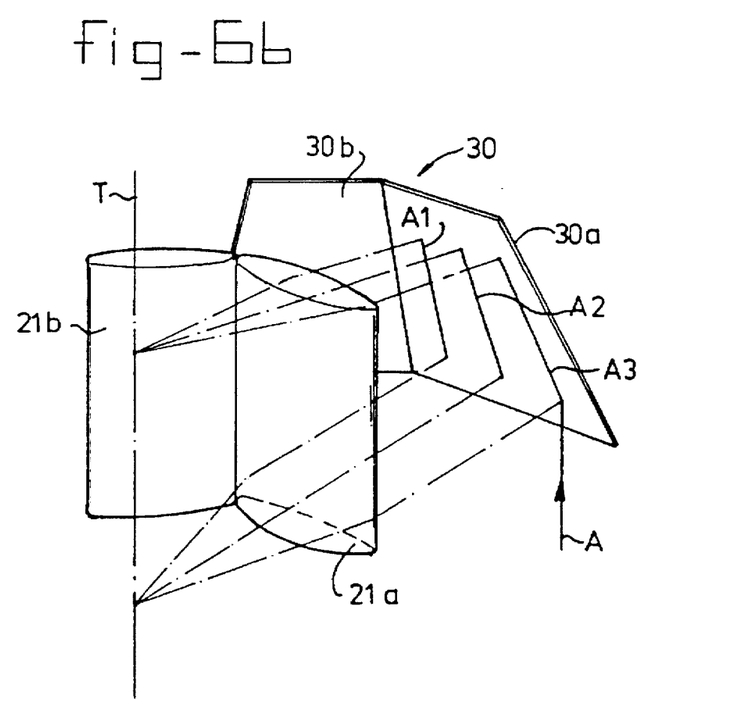

The number of reflective facets of mirror array 30 need not be as large as the number of scanning lines to be produced. As shown in FIG. 6b, e.g., three scanning lines A1, A2, A3 may be reflected by reflective facet 30a of mirror array 30. To convert each of the scanning lines A1, A2, A3 towards the scanning axis T, a cylindrical lens 21a is used. Likewise, for each of the other reflective facets 30b, . . . . cylindrical lenses 31b, . . . . , may be used.

Scanning lines produced by the embodiments according to figures 2 and 4 are curved. Because of the application of ring-shaped mirror 9, the longitudinal size of the optical scanner will be large. Moreover, when object Q passes through the hole in ring-shaped mirror 9 object Q will block the light beam A and no scanning pattern will be produced. Therefore, only a scanning pattern on all sides of object Q can be generated as long as the bottom part of object Q has not reached ring-shaped mirror 9. Therefore, the larger the length of object Q to be expected, the larger the distance between conic mirror 10, prism 20, or mirror array 30 and the ring-shaped mirror 9 needs to be.

Figure 8A:
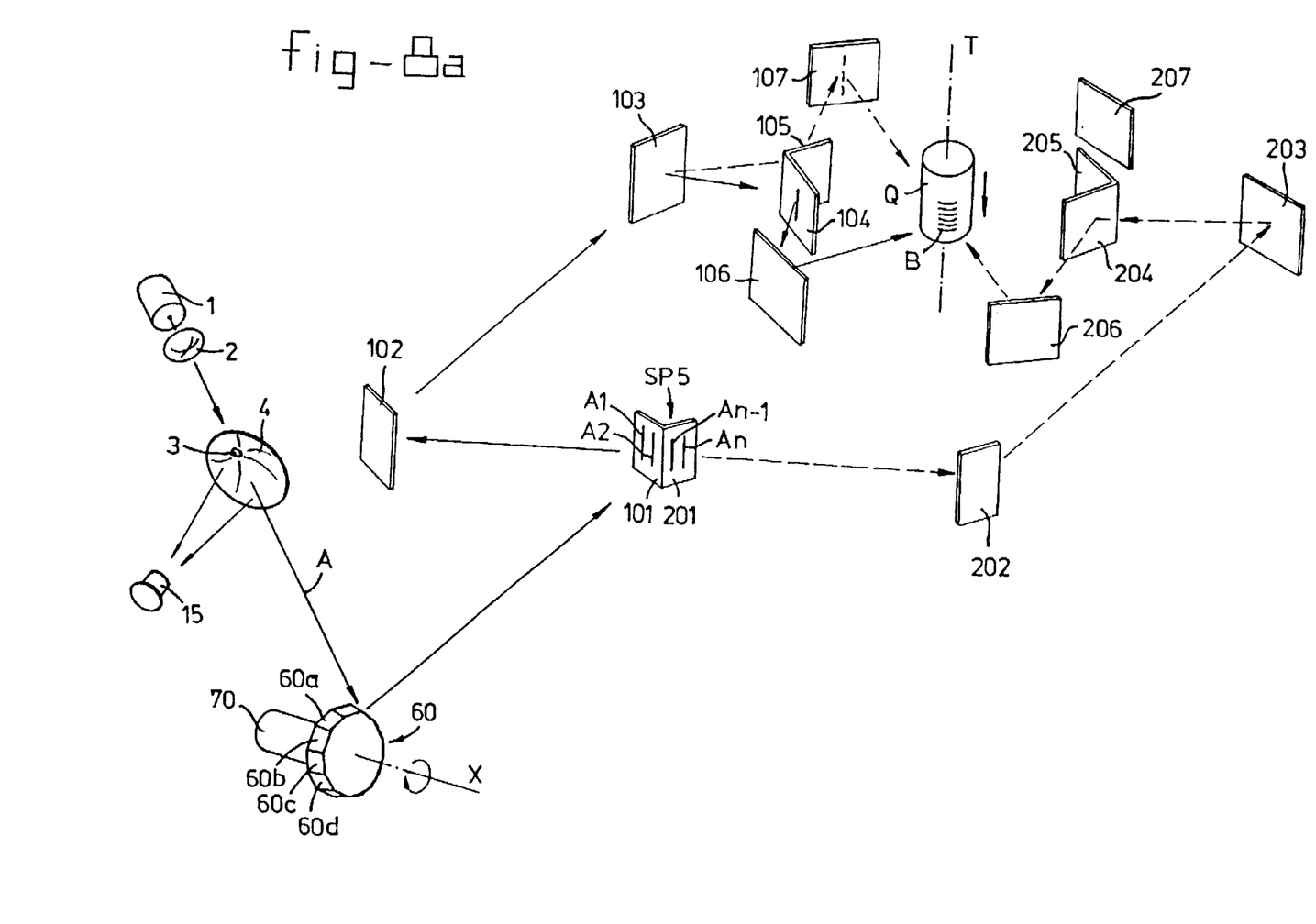

FIG. 8a shows a first embodiment in which these disadvantages are avoided.

In the arrangement according to FIG. 8a like elements as in FIG. 2 are indicated with the same reference numbers.

Light beam A originating from light source 1 is directed to a special shaped polygon 60 which will be explained with reference to FIG. 7a.

Figure 7A:
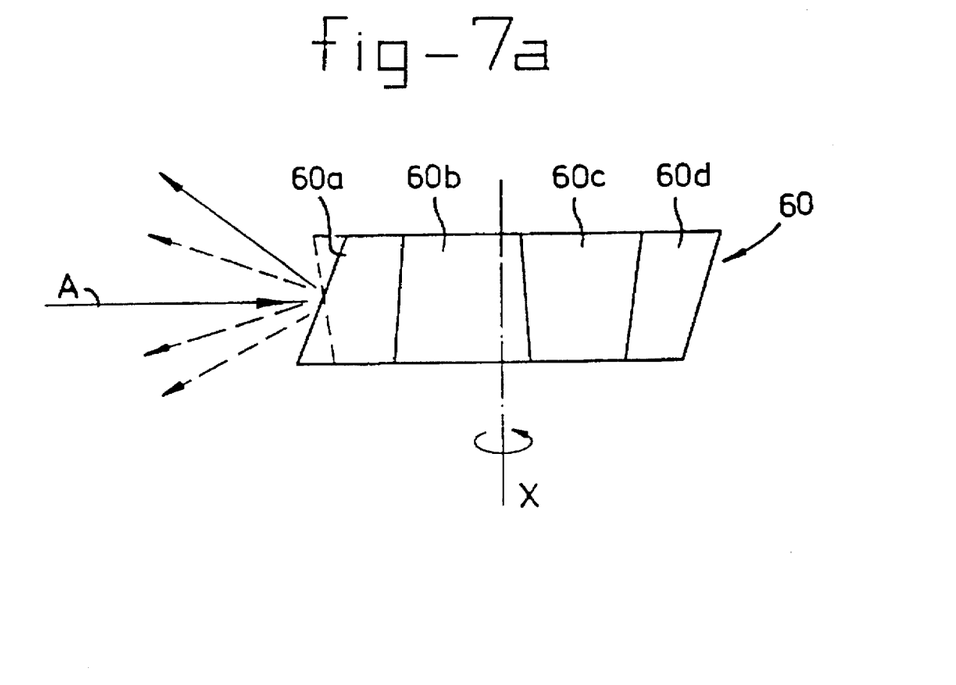

As shown in FIG. 7a polygon 60 is able to rotate about axis of rotation X. Polygon 60 is provided with several planar reflective facets 60a, 60b, 60c, 60d, . . . . . Each of the reflective facets 60a . . . . has a predetermined angle of inclination relative to the axis of rotation X. However, the angle of inclination relative to the axis of rotation X differs for each of the reflective facets 60a, . . . . . Therefore, light beam A will be reflected in different directions by each of the reflective facets 60a, 60b, 60c, 60d, . . . . Therefore, the rotating polygon 60 is able to produce a number of parallel scanning lines A1, A2, . . . . , An−1, An, as shown in figure 8a. The number of parallel scanning lines A1, A2, . . . . , An−1, An, depends on the number of reflective facets 60a, . . . .

Motor 70 is provided for rotating polygon 60.

As shown in FIG. 8a, some of the scanning lines A1, A2 are reflected by a mirror 101 towards a mirror 102, which reflect them towards mirror 103. Scanning line A1 is reflected by mirror 103 to a mirror 104, which reflects it to the scanning axis T through a mirror 106. Scanning line A2 is reflected by mirror 103 to mirror 105 which reflects it to scanning axis T through mirror 107. Mirrors 101–107 are arranged such that scanning lines A1, A2 will be reflected towards the scanning axis T from different sides. Similarly, scanning lines An−1, An are reflected by mirrors 201–207, arranged likewise as mirrors 101–107, to produce scanning lines directed to the scanning axis T from different sides.

Light reflected by object Q is collected by collector 4 and directed to the detector 15.

Figure 8B:
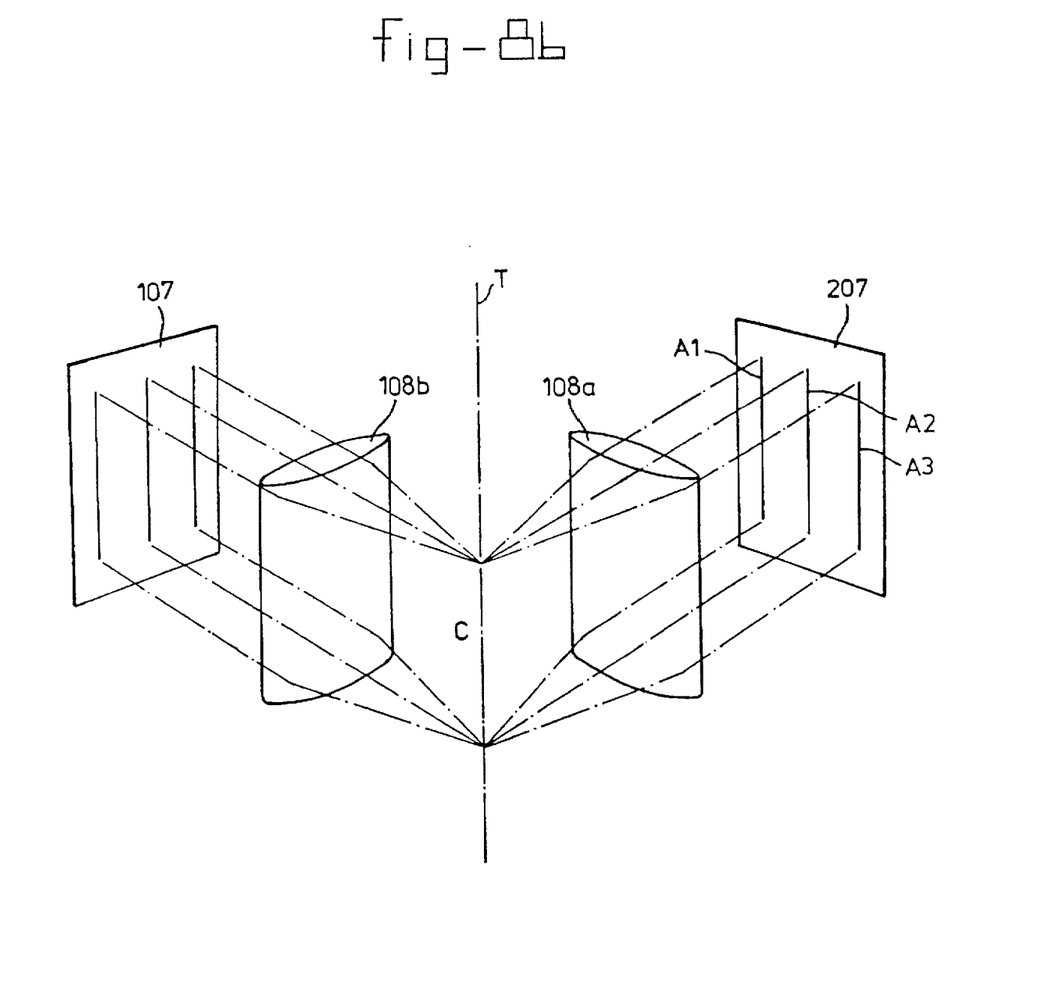

More than one scanning line may be projected by each of the mirrors 106, 107, 206, 207, to the object Q. However, then, in the arrangement according to FIG. a the scanning lines do not converge on the scanning axis T. In order to converge the scanning lines between each of the mirrors 106, 107, 206, 207 and the scanning axis T, optical converging means like cylindrical lenses, as shown with reference numbers 108, 108a, 108b, in FIG. 8b, may be used.

In the arrangement according to FIG. 8a object Q can be scanned from four different directions, i.e. from mirrors 106, 107, 206, and 207. Of course, the embodiment according to FIG. 8a can be modified to include more mirrors in order to scan object Q from more directions.

The number of mirrors used to reflect and to divide scanning lines A1, A2, . . . . , An−1, An, is not restricted to the number shown in FIG. 8a. The mirrors used only have to fulfil the requirement that they reflect the scanning lines produced by polygon 60 and separate them such that the object Q is scanned from several directions on all sides of object Q.

Figure 7B:
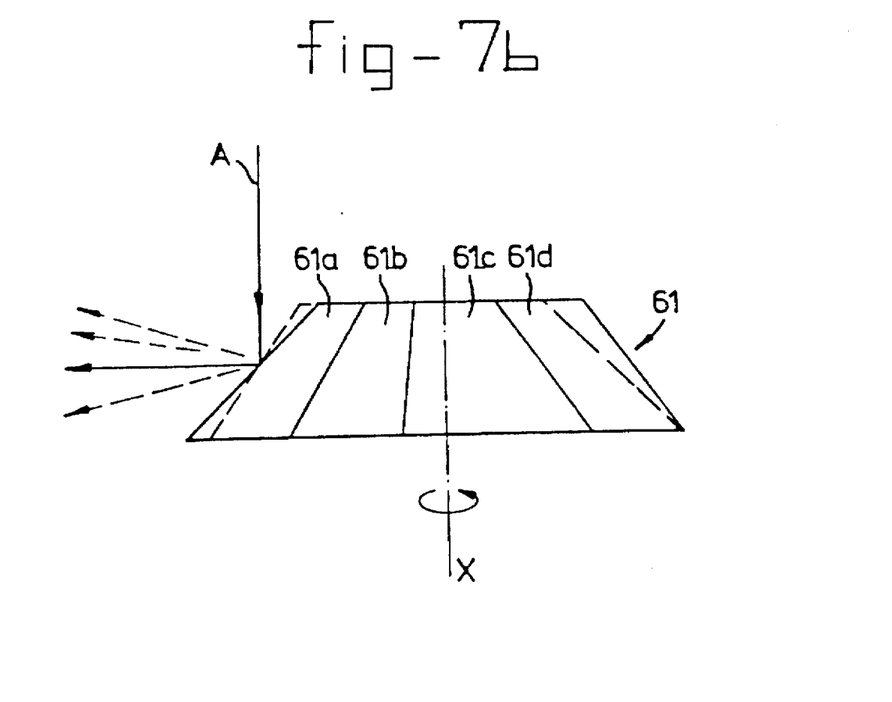

Instead of polygon 60 shown in FIGS. 7a and 8a, a special shaped polygon 61, as shown in FIG. 7b, may be used.

Special shaped polygon 61 is provided with several planar facets 61a, 61b, . . . . . Each of the planar facets 61a, . . . . , is slightly tilted relative to an angle of inclination of 45° relative to the axis of rotation X. Each of the planar reflective facets 61a, . . . , has a a different angle of inclination relative to the axis of rotation X. Impinging laser beam A may be substantially parallel to the axis of rotation X. Then, each of the reflective planar facets 61a, . . . , will produce a separate scanning line A2, . . . . An–1, An, as shown in FIG. 8a. The number of scanning lines produced depends on the number of facets 61a, . . . .

Figure 7C:
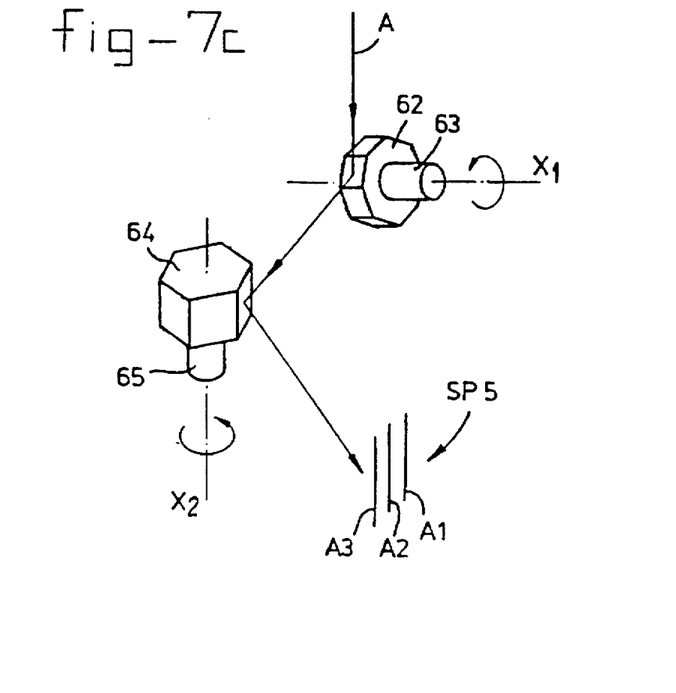
Figure 7D:
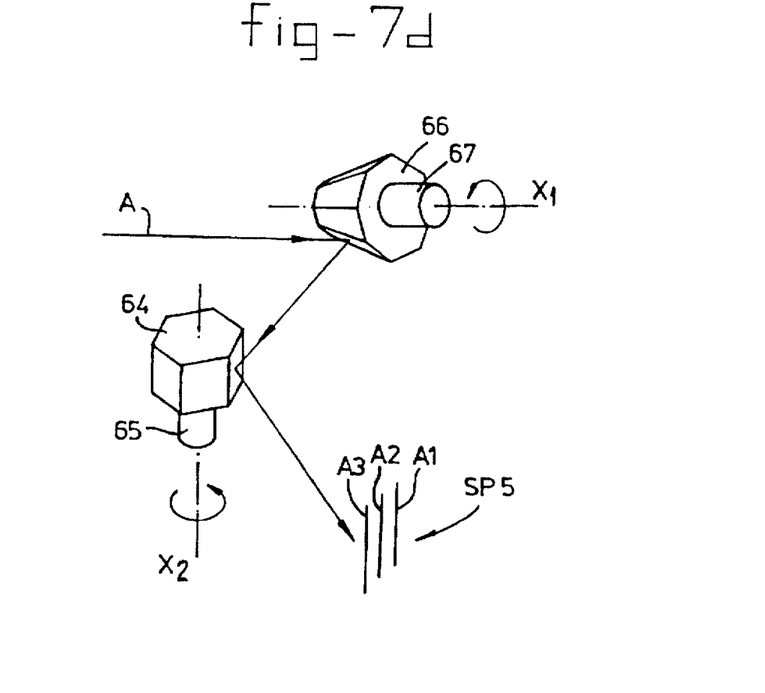

FIGS. 7c and 7d show examples of two rotating polygons able to produce several parallel scanning lines.

In the arrangement according to FIG. 7c a first polygon 62 is driven by a motor 63 to rotate about a first axis of rotation X1. The polygon 62 is provided with several planar reflective facets substantially parallel to the first axis of rotation X1. A second polygon 64 is provided with several reflective planar facets substantially parallel to a second axis of rotation X2. The second polygon 64 is driven by a motor 65. Second axis of rotation X2 is preferably perpendicular to the first axis of rotation X1. Preferably, the speed of rotation of polygon 62 is much higher than of polygon 64. Then, each of the reflective facets of polygon 62 will produce several scanning lines A1, A2, A3, . . . . , of a scanning pattern SP5.

AS will be apparent to a person skilled in the art, either one or both of the polygons 62, 64 may be substituted by oscillating mirrors.

FIG. 7d shows an alternative embodiment for the arrangement shown in FIG. 7c. In the arrangement according to FIG. 7d instead of polygon 62 and motor 63 a polygon 66 and motor 67, respectively, are used. Polygon 66 is provided with several reflective facets each of which are preferably tilted with respect to the axis of rotation X1 with an angle of inclination of substantially 45°. When polygon 66 is rotating much faster than polygon 64 each of the reflective facets of polygon 66 produces several parallel scanning lines A1, A2, A3, . . . . , of a scanning pattern SP5.

Of course, the embodiment shown in FIG. 8a is not restricted to the application of polygons 60, 61, 62, 64, 66 as shown in FIGS. 7a–7d for the production of substantially parallel scanning lines A1, A2, A3, . . . . . Any arrangement able to generate such parallel scanning lines and which are part of the prior art may be used instead.

I claim:

1. Optical scanner comprising a light source (1) for producing a light beam (A), focusing optics (2), means for producing a predetermined first scanning pattern (SP1–SP5) of separate scanning lines, first reflecting means (9; 101–104, 201–204) arranged to receive said predetermined first scanning pattern and to reflect each of the scanning lines of said first scanning pattern in a predetermined direction, and second reflecting means (10; 20; 30; 106, 107, 206, 207) arranged about a scanning axis (T), to receive said scanning lines and reflect them towards said scanning axis from several different directions in order to produce a second scanning pattern of scanning lines on all sides of an object (Q), said scanning lines in said second scanning pattern being substantially parallel to said scanning axis (T).

2. Optical scanner according to claim 1 wherein said means for producing a predetermined first scanning pattern of separate scanning lines comprises means for producing a star-shaped scanning pattern (SP1–SP4).

3. Optical scanner according to claim 2 wherein means for producing a star-shaped scanning pattern comprise a first mirror (5) connected to a motor (6) for rotating said first mirror (5) about an axis of rotation (X), said first mirror (5) being arranged for receiving and reflecting the light beam (A) from light source (1), a mirror array (7) provided with several reflective facets (7a, 7b . . . ) for receiving and reflecting the light beam (A) from the first mirror (5), and at least one second mirror (8) rotatable together with the first mirror (5) and arranged for receiving said light beam (A) from said mirror array (7) and arranged for producing said star-shaped scanning pattern about said axis of rotation (x).

4. Optical scanner according to claim 3 wherein said second mirror (8) is provided with two planar, reflective facets (8a, 8b) tilted about a predetermined angle with respect to the axis of rotation (X).

5. Optical scanner according to claim 2 wherein said means for producing a star-shaped scanning pattern comprise a polygon (50) rotatable about a first axis of rotation (X1) and rotatable about a second axis of rotation (X2) perpendicular tot said first axis of rotation (X1).

6. Optical scanner according to claim 5 wherein said polygon (50) is supported by a shaft (52) which is in turn supported by a frame (51), said frame being connected to a motor (53) for rotating said frame about said first axis of rotation (X1), said shaft (52) being provided with at least one wheel (54) arranged to run on a track (55) for rotating said shaft (52) about said second axis of rotation (X2) when said motor (53) is in operation.

7. Optical scanner according to claim 6 wherein said frame (51) is provided with an optical deflector (56) arranged for deflecting said light beam (A) originating from said light source (1) before it impinges upon said polygon (50), said optical deflector being selected from the following group of deflectors: an optical wedge (56), a mirror (57) and a holographic element (58).

8. Optical scanner according to claim 1 wherein said first reflecting means comprises a ring-shaped mirror (9).

9. Optical scanner according to claim 1 wherein said second reflecting means is selected from the following group of reflectors: a conic-shaped mirror (10), a prism (20) and a mirror array (30).

10. Optical scanner according to claim 1 wherein said second reflecting means comprises a mirror array (30) provided with several reflective facets (30a, 30b, . . . ) arranged symmetrical about said scanning axis (T), and a plurality of optical converging elements (21a, 21b, . . . ) arranged between said reflective facets (30a, 30b, . . . ) and said scanning axis (T).

11. Optical scanner according to claim 1 wherein said means for producing a predetermined first scanning pattern of separate scanning lines comprises means for producing a scanning pattern (SP5) of substantially parallel scanning lines.

12. Optical scanner according to claim 11 wherein said means for producing a scanning pattern (SP5) of substantially parallel scanning lines comprises a polygon (60; 61) rotatable about an axis of rotation (X) and comprising a plurality of reflective facets (60a, 60b, . . . ; 61a, 61b, . . . ), each of said reflective facets (60a, 60b, . . . ; 61a, 61b, . . . ) being tilted about its own predetermined angle of inclination with respect to said axis of rotation (x).

13. Optical scanner according to claim 11 wherein said means for producing a scanning pattern (SP5) of substantially parallel scanning lines comprises a first polygon (62; 66) and a second polygon (64), said first polygon (62; 66) being rotatable about a first axis of rotation (X1) and arranged for receiving and reflecting said light beam (A) originating from said light source (1), and said second polygon being rotatable about a second axis of rotation (X2) perpendicular to said first axis of rotation (X1) and arranged for receiving and reflecting said light beam (A) after being reflected by said first polygon.

14. Optical scanner according to claim 11 wherein said first reflecting means comprises a first plurality of separate mirrors (101-104, 201-204) arranged for receiving and reflecting said scanning pattern (SP5) of substantially parallel scanning lines, and for directing each of said scanning lines into a predetermined direction, and wherein said second reflecting means comprises a second plurality of separate mirrors (106, 107, 206, 207) symmetrically arranged about said scanning axis (T).

15. Optical scanner according to claim 14 wherein a plurality of optical converging elements (108a, 108b, ...) is provided between the second plurality of separate mirrors (106, 107, 206, 207) and the scanning axis (T).

* * * * *